US010839285B2

(12) United States Patent
Guo

(10) Patent No.: US 10,839,285 B2
(45) Date of Patent: Nov. 17, 2020

(54) LOCAL ABBREVIATION EXPANSION THROUGH CONTEXT CORRELATION

(71) Applicant: INTERNATIONAL BUSINESS MACHINES CORPORATION, Armonk, NY (US)

(72) Inventor: Yufan Guo, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 868 days.

(21) Appl. No.: 15/483,765

(22) Filed: Apr. 10, 2017

(65) Prior Publication Data
US 2018/0293494 A1 Oct. 11, 2018

(51) Int. Cl.
*G06N 3/04* (2006.01)
*G06N 3/08* (2006.01)
*G06F 40/16* (2020.01)
*G06F 40/216* (2020.01)
*G06F 40/284* (2020.01)

(52) U.S. Cl.
CPC ............. *G06N 3/04* (2013.01); *G06F 40/16* (2020.01); *G06F 40/216* (2020.01); *G06F 40/284* (2020.01); *G06N 3/084* (2013.01)

(58) Field of Classification Search
CPC ...................................................... G06N 3/08
USPC ...................................................... 706/15, 45
See application file for complete search history.

(56) References Cited

U.S. PATENT DOCUMENTS

| | | | |
|---|---|---|---|
| 5,444,820 A * | 8/1995 | Tzes | G06N 3/0436 706/21 |
| 7,028,038 B1 | 4/2006 | Pakhomov | |
| 7,191,150 B1 * | 3/2007 | Shao | G06Q 10/06312 705/38 |
| 8,712,776 B2 * | 4/2014 | Bellegarda | G10L 13/08 704/258 |
| 2005/0033569 A1 | 2/2005 | Yu | |
| 2012/0084076 A1 | 4/2012 | Boguraev et al. | |
| 2012/0262461 A1 | 10/2012 | Fisher et al. | |
| 2015/0095017 A1 * | 4/2015 | Mnih | G06N 3/0472 704/9 |
| 2016/0105386 A1 * | 4/2016 | Anders | G06F 40/274 709/206 |

* cited by examiner

*Primary Examiner* — David R Vincent
(74) *Attorney, Agent, or Firm* — Erik Huestis; Stephen Kenny; Foley Hoag LLP

(57) ABSTRACT

Local abbreviation expansion is provided through context correlation. In various embodiments, an abbreviation within a phrase is identified. The abbreviation is surrounded by a plurality of words. The words surrounding the abbreviation are provided to a trained neural network. The neural network includes a projection layer adapted to map inputs of the neural network onto a continuous vector space. An expansion is received from the trained neural network. The expansion corresponds to the abbreviation based on the surrounding plurality of words.

18 Claims, 3 Drawing Sheets

LOCAL ABBREVIATION EXPANSION THROUGH CONTEXT CORRELATION

BACKGROUND

Embodiments of the present invention relate to abbreviation expansion, and more specifically, to local abbreviation expansion through context correlation.

BRIEF SUMMARY

According to embodiments of the present disclosure, methods of and computer program products for abbreviation expansion are provided. In various embodiments, an abbreviation within a phrase is identified. The abbreviation is surrounded by a plurality of words. The words surrounding the abbreviation are provided to a trained neural network. The neural network includes a projection layer adapted to map inputs of the neural network onto a continuous vector space. An expansion is received from the trained neural network. The expansion corresponds to the abbreviation based on the surrounding plurality of words.

DETAILED DESCRIPTION

A variety of abbreviations are habitually used in user-generated records. Such abbreviations are particularly problematic in medical records, where the proper interpretation of a given abbreviation is highly context dependent.

As an example, the abbreviation "av" is commonly used in medical records, but may stand for "arteriovenous" or "atrioventricular" depending on context. Sample phrases illustrating this disparity are provided at Inset 1, below.

---

Inset 1

| | |
|---|---|
| av fistula in the left groin from artery to . . . | [arteriovenous] |
| av fistula in the left upper arm which is . . . | [arteriovenous] |
| transient third-degree av block during lv . . . | [atrioventricular] |
| first degree av block in sinus rhythm . . . | [atrioventricular] |

---

Features such as bag of words or word sequences usually result in a high dimensional vector, which may cause data sparsity issues when the size of available training data is incomparable to the number of features. Moreover, in a traditional feature space, words such as 'narrowing,' 'stenosis,' and 'normal' are equally distant from each other, which, ideally, should be modeled in a way such that words with similar meanings have similar contribution to anchoring a textual instance in a feature space.

Accordingly, in various embodiments, a learning system is trained to learn word vector representations that are good at predicting the nearby words. It will be appreciated that the present disclosure is not limited to single words, but is applicable to multiple word representations as well. Thus, the methods provided herein may operate at the concept level irrespective of the number of words expressing a concept. In some embodiments, concepts are identified in advance by a knowledge-driven concept extractor. In some embodiments, embeddings for each individual word are learned, and the sum or average of word embeddings is taken for a multiword concept.

Figure 1:
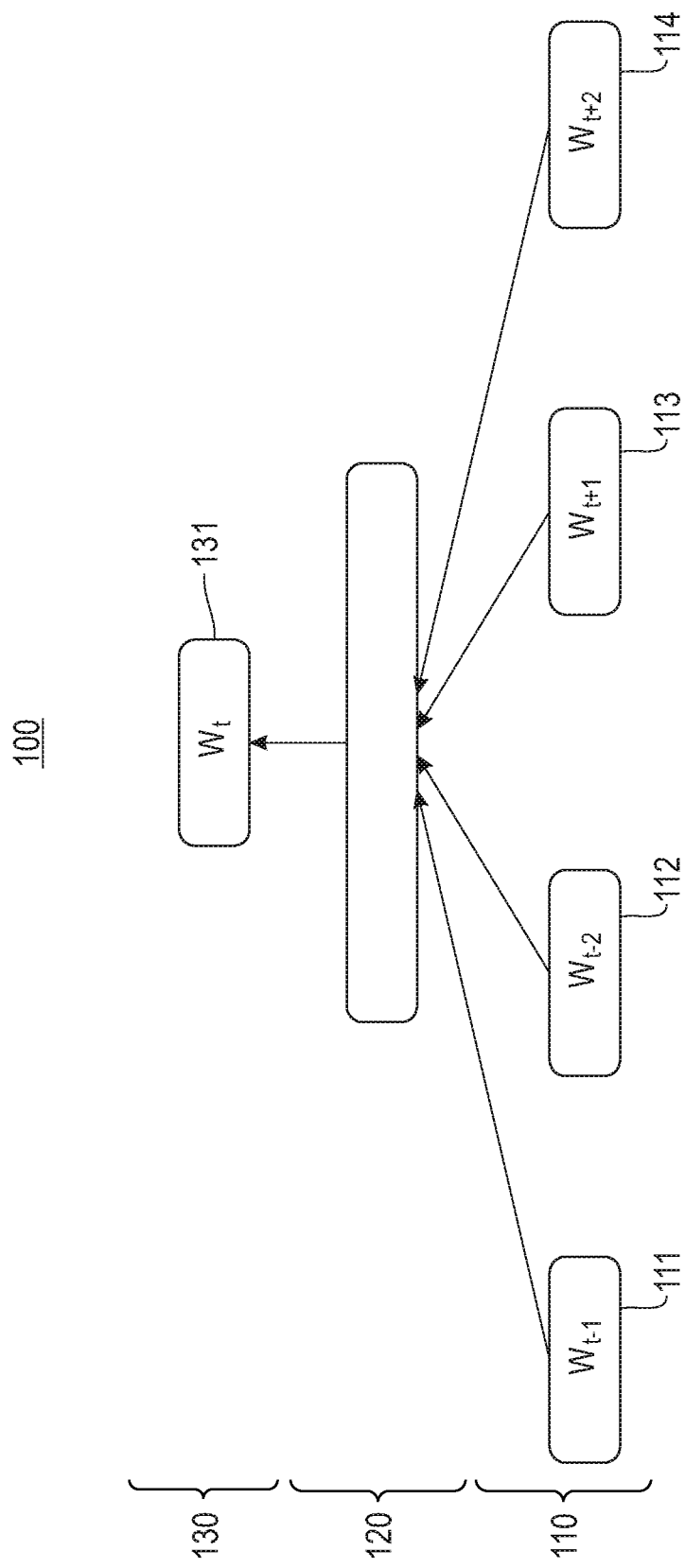
FIG. 1 is a schematic view of a neural network according to embodiments of the present disclosure.

With reference now to FIG. 1 a schematic view of a neural network according to embodiments of the present disclosure. Neural network 100 includes input layer 110, projection layer 120, and output layer 130. It will be appreciated that no hidden layers are shown solely for simplicity of explanation, and various numbers of hidden layers may be used in accordance with the present disclosure.

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

It will be appreciated that various networks may be adapted to learn multiple embeddings or senses per word or abbreviation. However, many such approaches assume a fixed number of senses or expansions per word or abbreviation, which is not the case in real-world data.

During training, a phrase comprising a plurality of words is considered: $\{W_{t-n}, \ldots, W_{t-1}, W_t, W_{t+1}, \ldots, W_{t+n}\}$. The words surrounding target word $W_t$ are provided as input 111 . . . 114 to neural network 100. Using this input, the neural network is trained to give $W_t$ as output 131. Once trained, the words surrounding an abbreviation may be provided to trained neural network 100 to generate an appropriate expansion. In this way, neural network 100 enables finding the expansion most similar to the abbreviation in the embedding space.

Figure 2:
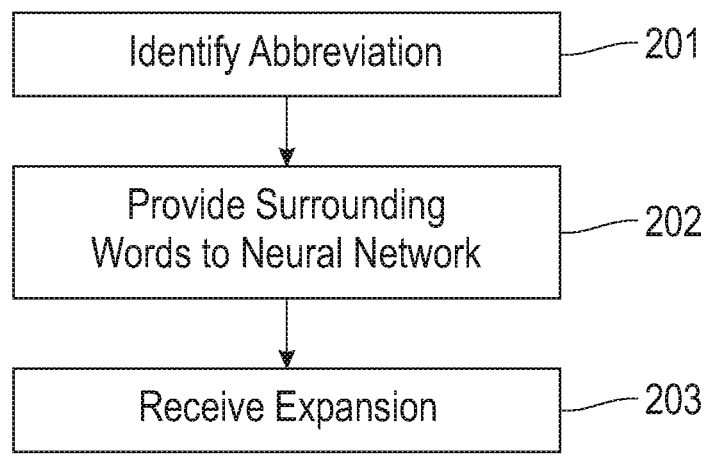
FIG. 2 illustrates a method of abbreviation expansion according to embodiments of the present disclosure.

With reference now to FIG. 2, a method of abbreviation expansion is illustrated according to embodiments of the present disclosure. At 201, an abbreviation within a phrase is identified. The abbreviation is surrounded by a plurality of words. In some embodiments, the abbreviation is identified by locating the abbreviation in a predetermined list of abbreviations. In some embodiments, the abbreviation is identified by failing to locate the abbreviation in a predetermined list of terms, e.g., a corpus of medical terminology. In some embodiments, the abbreviation is identified by locating the abbreviation as a prefix of one of a predetermined list of terms. For example, an abbreviation can be identified as being a prefix of one or more medical terms in a corpus of medical technology.

At 202, the words surrounding the abbreviation are provided to a trained neural network. The neural network includes a projection layer adapted to map inputs of the neural network onto a continuous vector space. It will be appreciated that a projection layer maps the discrete word indices of an n-gram context to a continuous vector space. In some embodiments, the projection layer is shared such that for contexts containing the same word multiple times, the same set of weights is applied to form each part of the projection vector. This organization effectively increases the amount of data available for training projection layer weights, as each word of each context training pattern individually contributes changes to the weight values. In some embodiments, each neuron in the projection layer is represented by a number of weights equal to the size of the vocabulary. In some embodiments, the projection layer does not use a non-linear activation function.

At 203, an expansion is received from the trained neural network. The expansion corresponds to the abbreviation based on the surrounding plurality of words.

In some embodiments, the neural network is trained by providing a plurality of words to the neural network. The plurality of words surround an expansion within a phrase. An output is received from the neural network. The synaptic weights of the neural network are adjusted based on a comparison between the expansion and the output. In some embodiments, the synaptic weights are adjusted by backpropagation.

In general, artificial neural networks (ANNs) are distributed computing systems, which consist of a number of neurons interconnected through connection points called synapses. Each synapse encodes the strength of the connection between the output of one neuron and the input of another. The output of each neuron is determined by the aggregate input received from other neurons that are connected to it. Thus, the output of a given neuron is based on the outputs of connected neurons from preceding layers and the strength of the connections as determined by the synaptic weights. An ANN is trained to solve a specific problem (e.g., pattern recognition) by adjusting the weights of the synapses such that a particular class of inputs produce a desired output.

Various algorithms may be used for this learning process. Certain algorithms may be suitable for specific tasks such as image recognition, speech recognition, or language processing. Training algorithms lead to a pattern of synaptic weights that, during the learning process, converges toward an optimal solution of the given problem. Backpropagation is one suitable algorithm for supervised learning, in which a known correct output is available during the learning process. The goal of such learning is to obtain a system that generalizes to data that were not available during training.

In general, during backpropagation, the output of the network is compared to the known correct output. An error value is calculated for each of the neurons in the output layer. The error values are propagated backwards, starting from the output layer, to determine an error value associated with each neuron. The error values correspond to each neuron's contribution to the network output. The error values are then used to update the weights. By incremental correction in this way, the network output is adjusted to conform to the training data.

Figure 3:
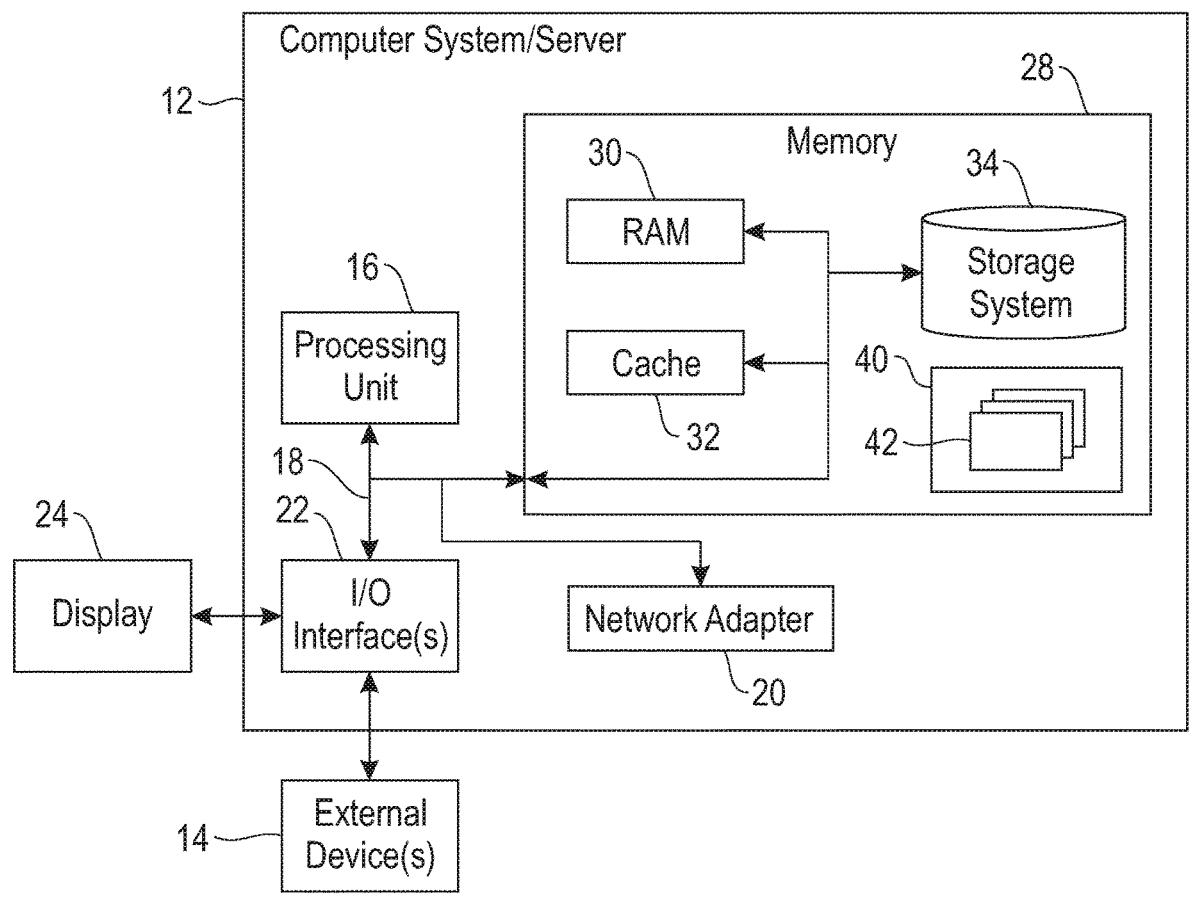
FIG. 3 depicts a computing node according to an embodiment of the present invention.

Referring now to FIG. 3, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    identifying an abbreviation within a phrase, the abbreviation being surrounded by a plurality of words;
    providing the plurality of words to a trained neural network, the neural network comprising a projection layer adapted to map inputs of the neural network onto a continuous vector space; and
    determining, at the trained neural network, an expansion corresponding to the abbreviation, the expansion based on the surrounding plurality of words.

2. The method of claim 1, wherein identifying the abbreviation comprises locating the abbreviation in a predetermined list of abbreviations.

3. The method of claim 1, wherein identifying the abbreviation comprises failing to locate the abbreviation in a predetermined list of terms.

4. The method of claim 1, wherein identifying the abbreviation comprises locating the abbreviation as a prefix of one of a predetermined list of terms.

5. The method of claim 1, further comprising training the neural network, wherein training comprises:
    providing a plurality of words to the neural network, the plurality of words surrounding an expansion within a phrase;
    receiving an output from the neural network; and
    adjusting synaptic weights of the neural network based on a comparison between the expansion and the output.

6. The method of claim 5, wherein the synaptic weights are adjusted by backpropagation.

7. A system comprising:
    a data store;
    a computing node comprising a computer readable storage medium having program instructions embodied therewith, the program instructions executable by a processor of the computing node to cause the processor to perform a method comprising:
        reading a phrase from the data store;
        identifying an abbreviation within the phrase, the abbreviation being surrounded by a plurality of words;
        providing the plurality of words to a trained neural network, the neural network comprising a projection layer adapted to map inputs of the neural network onto a continuous vector space; and
        determining, at the trained neural network an expansion corresponding to the abbreviation, the expansion based on the surrounding plurality of words.

8. The system of claim 7, wherein identifying the abbreviation comprises locating the abbreviation in a predetermined list of abbreviations.

9. The system of claim 7, wherein identifying the abbreviation comprises failing to locate the abbreviation in a predetermined list of terms.

10. The system of claim 7, wherein identifying the abbreviation comprises locating the abbreviation as a prefix of one of a predetermined list of terms.

11. The system of claim 7, the method further comprising training the neural network, wherein training comprises:
    providing a plurality of words to the neural network, the plurality of words surrounding an expansion within a phrase;
    receiving an output from the neural network; and
    adjusting synaptic weights of the neural network based on a comparison between the expansion and the output.

12. The system of claim 11, wherein the synaptic weights are adjusted by backpropagation.

13. A computer program product for abbreviation expansion, the computer program product comprising a computer readable storage medium having program instructions embodied therewith, the program instructions executable by a processor to cause the processor to perform a method comprising:
    identifying an abbreviation within a phrase, the abbreviation being surrounded by a plurality of words;
    providing the plurality of words to a trained neural network, the neural network comprising a projection layer adapted to map inputs of the neural network onto a continuous vector space; and
    determining, at the trained neural network an expansion corresponding to the abbreviation, the expansion based on the surrounding plurality of words.

14. The computer program product of claim 13, wherein identifying the abbreviation comprises locating the abbreviation in a predetermined list of abbreviations.

15. The computer program product of claim 13, wherein identifying the abbreviation comprises failing to locate the abbreviation in a predetermined list of terms.

16. The computer program product of claim 13, wherein identifying the abbreviation comprises locating the abbreviation as a prefix of one of a predetermined list of terms.

17. The computer program product of claim 13, the method further comprising training the neural network, wherein training comprises:
    providing a plurality of words to the neural network, the plurality of words surrounding an expansion within a phrase;
    receiving an output from the neural network; and
    adjusting synaptic weights of the neural network based on a comparison between the expansion and the output.

18. The computer program product of claim 17, wherein the synaptic weights are adjusted by backpropagation.

* * * * *